UNITED STATES PATENT OFFICE.

WILLIAM W. CROOKER, OF LYNN, MASSACHUSETTS, ASSIGNOR TO FRANK E. WACHTLER, OF BOSTON, MASSACHUSETTS.

ART OF FINISHING SURFACES OF HEELS, SOLES, &c.

No. 876,861.   Specification of Letters Patent.   Patented Jan. 14, 1908.

Application filed April 5, 1907. Serial No. 366,642.

*To all whom it may concern:*

Be it known that I, WILLIAM W. CROOKER, of Lynn, in the county of Essex and State of Massachusetts, have invented certain new and useful Improvements in the Art of Finishing Surfaces of Heels, Soles, &c., of which the following is a specification.

This invention relates to the operation of applying final smooth and lustrous surfaces to articles such as boot and shoe heels, soles and other parts of boots and shoes, or to any article of leather or a similar material, preferably having a surface prepared for the final finish by abrasion or buffing, although the surface may be the natural grain surface of leather which has not been abraded or buffed.

The invention has for its object to provide a durable, water-proof, lustrous finish free from liability to spontaneous change or discoloration, and capable of being produced at a greatly decreased expense as compared with the expense of finishing surfaces of boot and shoe heels, etc. by the methods and processes heretofore employed.

The invention involves the application of two successive coatings to the surface to be finished, the first containing coloring matter dissolved in caustic alkali, and an artificial vegetable wax, preferably composed of a vegetable wax in solution, and stearic acid, while the second coating contains vegetable oils or other suitable oleaginous matter which combines with the wax in the first coating, and also contains a color strengthening element, such as denatured alcohol or its equivalent, which acts upon the dissolved coloring matter, and restores wholly or in part the strength taken from the color by the action of the caustic alkali. The second coating is applied after the first has been suitably dried and finished, the two coatings being adapted to be intimately united by heat and when so united forming a homogeneous coating, which is indivisible, and does not consist of separate independent films. The application of the second coating results in a high luster on the treated surface, and in a strengthening of the color, the finished surface being brought to the desired degree of luster without the expenditure of time and labor in applying friction, which has heretofore been required to produce a lustrous surface.

In carrying out my invention I proceed as follows: In preparing the two coatings I employ the following ingredients, in preferably the proportions hereinafter specified, although the proportions may be varied and other well-known equivalent ingredients may be employed without departing from the spirit of the invention, both in the preparation of the first and the second coatings. In making the first coating I add to one gallon of boiling water, two ounces of a caustic alkali, preferably caustic soda, substantially pure. I have used with good results, caustic soda 98 per cent. pure. To this is added two and one-half ounces of oleic acid, chemically pure, the acid being dissolved with the alkali. I then add one pound of the casein of commerce, which is thoroughly dissolved by the solution formed by the oleic acid and alkali, the said solution constituting an efficient solvent for the casein. The solution above described is formed in a vessel by itself while the water is at the boiling point.

In a separate vessel I melt one-half pound of any suitable vegetable wax, and a suitable quantity of stearic acid, thus forming an artificial vegetable wax, to which is added one ounce of oleic acid. To this is then added the solution formed in the first vessel. The result of the addition of the melted wax with the solution, is the formation of an emulsion in which the wax is partly dissolved, instead of being in a saponified condition, as heretofore in all alkaline compositions for this purpose containing wax. This partial dissolving of the wax is due to the action of the oleic acid, which makes nearly a true solution of wax instead of a saponification, as is the case when an ordinary alkali is employed. The first composition is completed by the addition of a sufficient amount, say, six to eight ounces, of any suitable coloring matter, preferably anilin, of sufficient strength to resist as far as possible the alkaline re-action of the caustic alkali, the coloring matter being dissolved and held in solution.

The second coating is prepared as follows: I first melt in a suitable receptacle the following ingredients which are soluble in alcohol; viz., two to eight ounces more or less, of a resin known as *Callitris quadrivalvis*, a product of northern Africa, together with about the same quantity of another resin or pitch known as *Picea excelsa*, suitable oleaginous matter, preferably one or more vegetable oils, such as lucca, and sassafras oils, using two to six ounces more or less of each oil, and a vegetable balsam, known as gurjun, one to four ounces of the latter being sufficient. When these ingredients are in a melted condition, I add to the mixture a sufficient quantity of denatured alcohol containing a small amount of camphor, the latter acting with the denatured alcohol as a solvent for the oils and resins employed, the quantity of alcohol employed being sufficient to give the composition the desired fluidity. A small amount of coloring matter, preferably anilin, may be added to the composition for the second coating, half an ounce of coloring matter to a gallon of the composition being sufficient.

The two compositions are applied separately, in the order in which they are described above, a layer or coating of each composition being applied to the surface to be finished, said surface having been preferably previously abraded and buffed, so that it is in a receptive condition, although the surface may be the natural grain surface without abrasion or buffing. A coating of the first composition is applied to the surface to be treated by a brush or other suitable means, and is thoroughly dried and hardened. After the drying of the coating thus formed, I prefer to subject it to the action of a dry bristle brush, in order to remove any slight irregularities or traces of the brush which applied the coating, the object being to leave the coating in a smooth condition and devoid of any slight irregularities, projections or depressions.

To the dried and smoothed first coating, I apply a second coating, composed of a thin layer of the second composition, this being applied with a brush to form as thin a coating as possible. The second coating is dried either by artificial heat in a suitable receptacle, or by a more protracted exposure to atmosphere action. The second coating, when dried, possesses a surface which is highly lustrous, and has the effect of a surface highly polished by long-continued friction. I find that in practice the luster appearing after the application and drying of the second coating is undesirably high. In other words, the surface is excessively shiny, so that it is desirable and in most cases necessary, to somewhat dim the luster. This may be accomplished by applying to the finished surface, a rapidly rotating operating member, preferably having a yielding acting face or periphery of woolen cloth carrying a composition which when rubbed upon the polished surface, somewhat reduces its luster to suit the requirements of the trade. The said composition may be composed of the following ingredients, mixed to form a composition having a smooth consistency, and adapted to saturate or partially saturate the yielding acting face of the said operating member; vegetable wax, 12 oz.; stearic acid, 1 oz.; cerasin, 4 oz.; lard oil, 2 oz., and kerosene oil, 10 oz. Said ingredients are melted and mixed while in a melted condition.

The first and second coatings are intimately united during the drying of the second coating. The oleaginous matter contained in the second coating is carried into the first coating by the action of the heat employed in drying the second coating, the said oleaginous matter combining with the wax in the first coating. This combination gives the finish a durable, flexible and waterproof character without producing a surface film which can be removed or affected, the entire finish being homogeneous so that the part applied by the second coating cannot be affected in any way without destroying the part applied by the first coating. The denatured alcohol contained in the second coating acts on the dissolved color in the first coating in such manner as to restore the greater part of the strength of which the color was deprived by the action of the caustic alkali, it being impossible to dissolve an anilin color in a solution containing caustic alkali without a loss of some of its strength. This loss is mainly made up by the action of the alcohol contained in the second coating.

An important characteristic of my invention is the fact that the wax employed is not saponified. Heretofore wax employed in finishing compositions has invariably been saponified, the result being that in the course of time if the finished article is not put into immediate use, the surface turns gray, or presents an appearance such as would be imparted by a fine white powder sifted thinly. The finish is much more durable and water-proof than any heretofore produced so far as I am aware.

My invention is further characterized by the fact that the luster is produced by an intimate union between two successively applied coatings caused by heat during the drying of the final coating, no friction being required or employed to raise a luster, and the only friction employed on the second coating being for the purpose of decreasing the luster should the latter be too high. The invention results in a great saving of time and in the number of operations required.

The preferred procedure in finishing the surfaces of heels and soles of boots and shoes is as follows: After the edges of the sole and heel have been trimmed, the bottom of the sole and heel are buffed or abraded, and the margin of the heel is scoured as usual. A coating of the first composition is then applied to the edges and bottom of the sole and heel, the edge including the welt in a welted shoe. The work is then laid aside until the first coating is thoroughly dry, after which the edges of the sole may be set with an ordinary heated edge setting tool, and the coated surfaces of the heel and of the bottom of the sole are acted on by a dry brush to give the said surfaces the desired smoothness. A thin coating of the second composition is then applied to all the above-mentioned surfaces, and the boot or shoe is subjected to a drying operation either in a closed heated receptacle or by a more extended exposure to atmospheric action, until the denatured alcohol and oils of the second coating have become a part of the first coating. The resulting luster is so high that in most cases it must be reduced or dimmed by the application to the finished surfaces of a yielding operating member and a suitable luster-reducing composition, such as that above described, carried thereby, although the said composition may be applied as a coating to the finished surface, and the yielding operating member subsequently applied thereto.

I claim:

1. That improvement in the art of finishing surfaces of heels, etc., which consists in applying a preliminary coating containing wax in emulsion, and then applying a finishing coating adapted to be united by heat with the first coating.

2. That improvement in the art of finishing surfaces of heels, etc., which consists in applying a preliminary coating containing wax in emulsion, and then applying a finishing coating containing oleaginous matter in solution which unites with the wax in the preliminary coating.

3. That improvement in the art of finishing surfaces of heels, etc., which consists in applying a preliminary coating containing wax in emulsion and an alkaline solution of coloring matter, and then applying a finishing coating containing an alcohol, which restores the loss of strength in the coloring matter caused by the alkaline solvent thereof.

4. That improvement in the art of finishing surfaces of heels, etc., which consists in applying successive coatings, adapted to be united by heat, one containing wax in emulsion and an alkaline solution of coloring matter, while the other contains ingredients which combine with the wax and the coloring matter in solution to make the finished surface waterproof and strengthen the color.

5. That improvement in the art of finishing surfaces of heels, etc., which consists in applying a preliminary coating containing coloring matter, an alkali and oleic acid, said coating also containing a vegetable wax in emulsion, and then applying a finishing coating adapted to be united to the preliminary coating by heat.

6. That improvement in the art of finishing surfaces of heels, etc., which consists in applying a preliminary coating containing casein in solution, coloring matter in solution, and vegetable wax in emulsion, and then applying a finishing coating adapted to be united to the preliminary coating by heat.

7. That improvement in the art of finishing surfaces of heels, etc., which consists in applying a preliminary coating containing wax in emulsion, and coloring matter, drying the same, and applying a finishing coating having ingredients which combine with the wax and coloring matter to produce a brilliant luster by the drying of the finishing coating and without friction.

8. That improvement in the art of finishing surfaces of heels, etc., which consists in applying a preliminary coating containing wax in emulsion, and coloring matter, drying the same, applying a finishing coating which is united to the wax and coloring matter by heat, to produce a brilliant luster by the drying of the finishing coating and without friction, and applying a luster-reducing composition to modify the gloss of the resulting surface.

In testimony whereof I have affixed my signature in presence of two witnesses.

WILLIAM W. CROOKER.

Witnesses:
C. F. BROWN,
E. BATCHELDER.